(12) United States Patent
Szul et al.

(10) Patent No.: US 7,157,531 B2
(45) Date of Patent: Jan. 2, 2007

(54) METHODS FOR PRODUCING POLYMERS WITH CONTROL OVER COMPOSITION DISTRIBUTION

(75) Inventors: John F. Szul, Hurricane, WV (US); James McLeod Farley, League City, TX (US)

(73) Assignee: Univation Technologies, LLC, Houston, TX (US)

( * ) Notice: Subject to any disclaimer, the term of this patent is extended or adjusted under 35 U.S.C. 154(b) by 123 days.

(21) Appl. No.: 10/872,847

(22) Filed: Jun. 21, 2004

(65) Prior Publication Data

US 2005/0282980 A1 Dec. 22, 2005

(51) Int. Cl.
*C08F 2/34* (2006.01)

(52) U.S. Cl. ............ 526/79; 526/160; 526/170; 526/348.5; 526/901; 526/905

(58) Field of Classification Search ........... 526/70, 526/79, 348, 901, 160, 170, 348.5, 905
See application file for complete search history.

(56) References Cited

U.S. PATENT DOCUMENTS

| | | | |
|---|---|---|---|
| 4,543,399 A | 9/1985 | Jenkins, III et al. | |
| 4,588,790 A | 5/1986 | Jenkins, III et al. | |
| 5,322,728 A | 6/1994 | Davey et al. | |
| 5,866,661 A | 2/1999 | Benham et al. | |
| 6,096,840 A | 8/2000 | Bernier et al. | |
| 6,214,960 B1 | 4/2001 | Marissal et al. | |
| 6,242,545 B1 | 6/2001 | Jejelowo et al. | |
| 6,248,845 B1 | 6/2001 | Loveday et al. | |
| 6,265,502 B1 | 7/2001 | Herzog | |
| 6,270,891 B1 | 8/2001 | Maugans et al. | |
| 6,284,848 B1 | 9/2001 | Durand et al. | |
| 6,362,290 B1 | 3/2002 | Durand et al. | |
| 6,403,730 B1 | 6/2002 | Mutsers | |
| 6,407,184 B1 | 6/2002 | Matsuda et al. | |
| 6,407,185 B1 | 6/2002 | Promel | |
| 6,420,516 B1 | 7/2002 | Tau et al. | |
| 6,437,062 B1 | 8/2002 | Maddox et al. | |
| 6,472,484 B1 | 10/2002 | Abe et al. | |
| 6,489,408 B1 | 12/2002 | Mawson et al. | |
| 6,506,866 B1 | 1/2003 | Jacobsen et al. | |
| 6,528,597 B1 | 3/2003 | Loveday et al. | |
| 6,538,081 B1 | 3/2003 | Muruganandam et al. | |
| 6,555,632 B1 | 4/2003 | Zandona | |
| 6,936,675 B1 * | 8/2005 | Szul et al. ............ | 526/348.2 |
| 2003/0017354 A1 | 1/2003 | Bayley et al. | |
| 2003/0088038 A1 | 5/2003 | Vaughan et al. | |
| 2003/0096128 A1 | 5/2003 | Farley et al. | |

FOREIGN PATENT DOCUMENTS

WO    WO 93/03093    2/1993

OTHER PUBLICATIONS

Colin Li Pi Shan; Joao B. P. Soares; Alexander Penlidis; *Ethylene/1-Octene Copolymerization Studies with In Situ Supported Metallocene Catalysts: Effect of Polymerization Parameters on the Catalyst Activity and Polymer Microstructure*; Journal of Polymer Science: Part A: Polymer Chemistry, vol. 40, 4426-4451 (2002).
Davey, Chris R.; Shirodkar, P.P.; Liu, H.T.; *Engineered Catalyst for Controlled Bimodal Structures in UNIPOL Single Reactor Gas Phase Polyethylene*; SPE-Polyolefins 2002 International Conference: Feb. 25-27, 2002.
US 5,883,203, 03/1999, Cheruvu et al. (withdrawn)

* cited by examiner

*Primary Examiner*—Fred Teskin
(74) *Attorney, Agent, or Firm*—Kevin M. Faulkner; Leandro Arechederra

(57) ABSTRACT

Methods for controlling a melt viscosity of a polyolefin, controlling comonomer distribution of a polyolefin, achieving a targeted melt viscosity of a polyolefin, and films made from such polyolefins are provided. The methods include contacting an olefin monomer and at least one comonomer with a catalyst system in the presence of a condensable fluid comprising a saturated hydrocarbon having from 2 to 8 carbon atoms. The catalyst system in one embodiment includes a hafnium metallocene catalyst component.

13 Claims, 2 Drawing Sheets

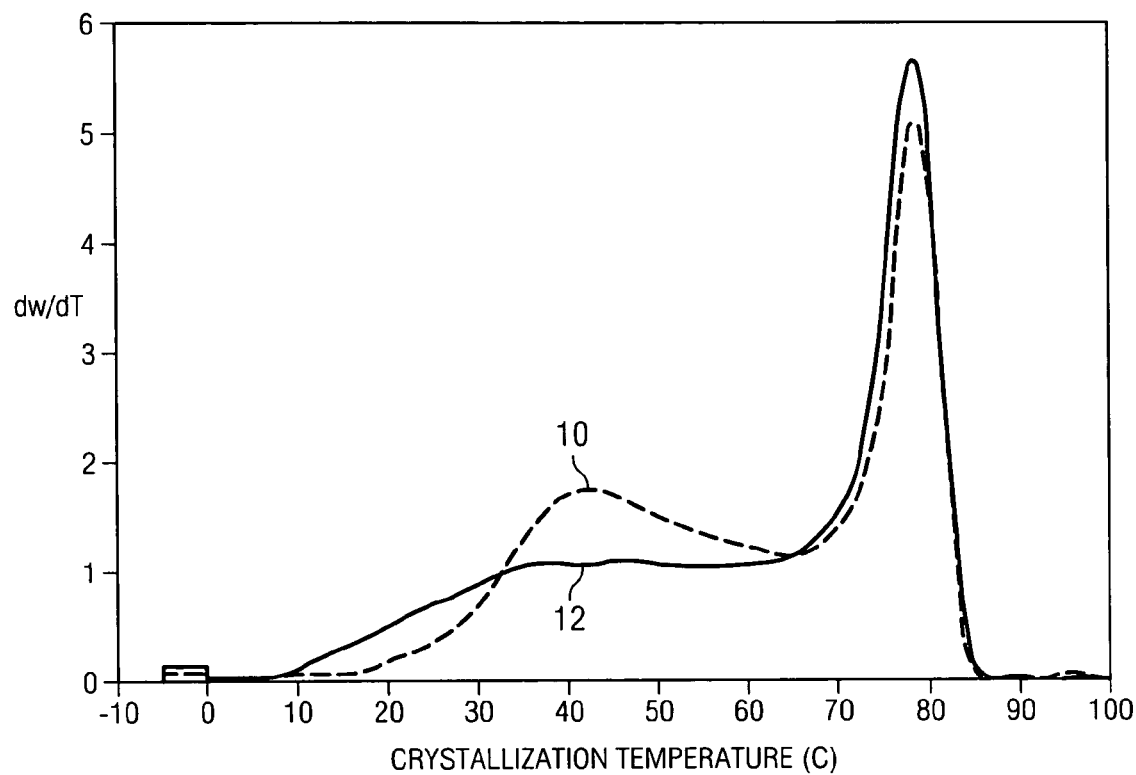
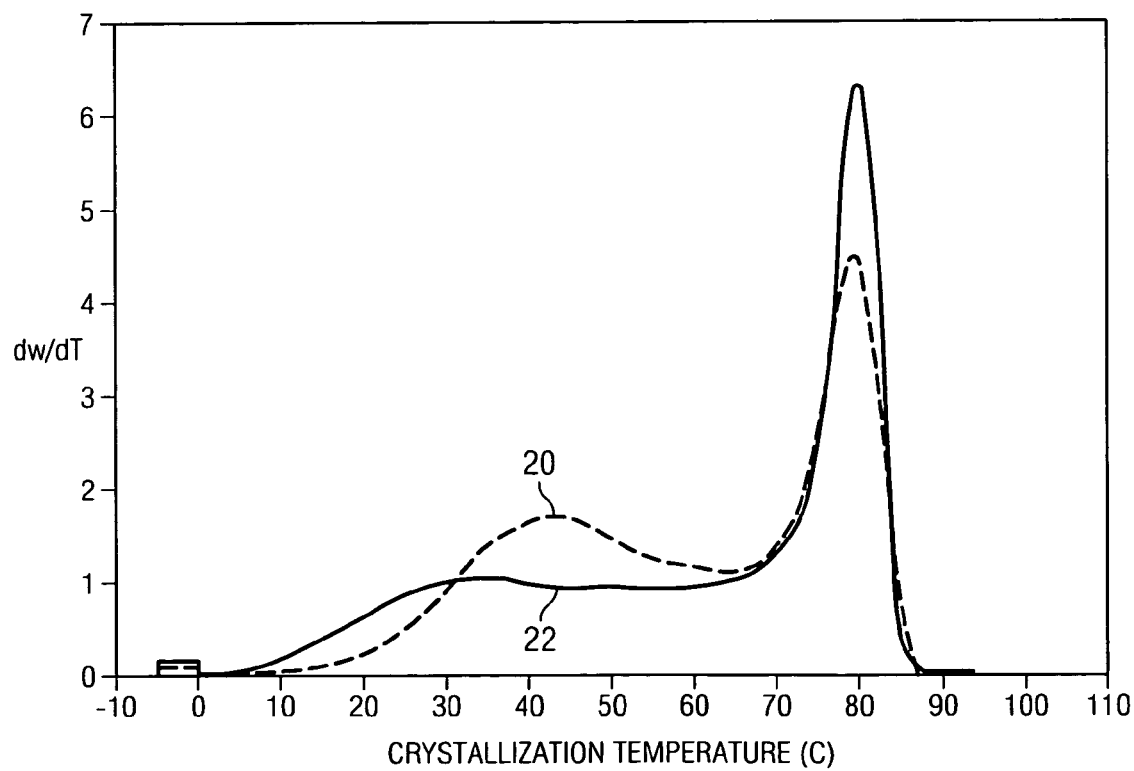

US 7,157,531 B2

METHODS FOR PRODUCING POLYMERS WITH CONTROL OVER COMPOSITION DISTRIBUTION

TECHNICAL FIELD

The present invention relates to polymerization methods that provide control over the composition distribution and melt viscosity of polymers, in particular, polyolefins, produced according to such methods.

BACKGROUND

Polyolefins are typically produced as a copolymer of an olefin monomer and an olefin comonomer. For example, linear low density polyethylenes (hereinafter, referred to as "LLDPE" in some cases) are usually produced by copolymerizing ethylene (the olefin monomer) with an alpha-olefin such as 1-hexene (the olefin comonomer). Typically, polymerization typically occurs in the presence of a transition metal compound catalyst such as a Ziegler-Natta catalyst, chromium based catalyst, and/or a metallocene catalyst. Polymerization processes generally include solution polymerization, slurry polymerization and gas phase polymerization. The polymers, and in particular, polyethylene copolymers, produced by any of the foregoing polymerization processes possess a composition distribution that is largely dependent upon the type of catalyst used. A "broad" composition distribution means that of the polymer chains produced, the amount of comonomer incorporated into each polymer chain varies within a broad range, whereas a "narrow" composition distribution is one where the comonomer is incorporated evenly among the polymer chains. This characteristic is often referred to as CDBI (Composition Distribution Breadth Index) known to those skilled in the art.

It is desirable in any commercial polymerization process to have the option of tailoring the process such that the resultant polymer has the desired characteristics. One such tailorable characteristic of a polymer is its CDBI value. Many catalyst systems comprising a metallocene are typically known to produce narrow CDBI polymers such as polyethylene, or stated another way, polymers having a CDBI of greater than 50 or 60%, the percentage referring to the weight percent of the polymer molecules having a comonomer content within 50% of the median total molar comonomer content, such as described in WO 93/03093. On the other hand, certain metallocenes, such as those hafnocenes disclosed in U.S. Pat. No. 6,242,545 and WO 2004/000919 are known to produce polyethylenes having a broad CDBI, or less than 50 or 40%. The CDBI of a polymer, among other parameters, are known to influence the properties and thus usefulness of the polymer for certain applications. What would be desirable, however, is a method of controlling the CDBI of a polymer, in particular, polyethylene, without having to change the type of catalyst being used.

SUMMARY

The present invention provides in one aspect a method of producing a polyolefin comprising contacting in a fluidized bed gas phase reactor an olefin monomer and at least one comonomer with a catalyst system in the presence of a first amount of at least one condensable fluid to produce a first polyolefin, followed by contacting a second amount of at least one condensable fluid to produce a second polyolefin; characterized in that when the amount of condensable fluid contacted is changed incrementally from 0 mol % to 20 mol %, the CDBI of the second polyolefin is greater than that of the first polyolefin.

In an independent or further aspect, the present invention provides a method of controlling the melt viscosity of polyolefins comprising contacting in a fluidized bed gas phase reactor a first amount of hydrogen, an olefin monomer and at least one comonomer with a catalyst system comprising a hafnocene in the presence of at least one condensable fluid to produce a first polyolefin having a first $I_2$ value, followed by contacting a second amount of hydrogen to produce a second polyolefin; characterized in that when the second amount of hydrogen is greater than the first amount of hydrogen, the $I_2$ value of the second polyolefin is less than that of the first polyolefin.

BRIEF DESCRIPTION OF THE DRAWINGS

FIG. 1 illustrates a CRYSTAF crystallization curve for polymers produced according to a polymerization method utilizing a hafnium metallocene catalyst in the presence of isopentane (10), and in the absence of isopentane (12).

FIG. 2 illustrates a CRYSTAF crystallization curve for polymers produced according to a polymerization method utilizing a hafnium metallocene catalyst in the presence of isopentane (20), and in the absence of isopentane (22).

DETAILED DESCRIPTION

Figure 3:
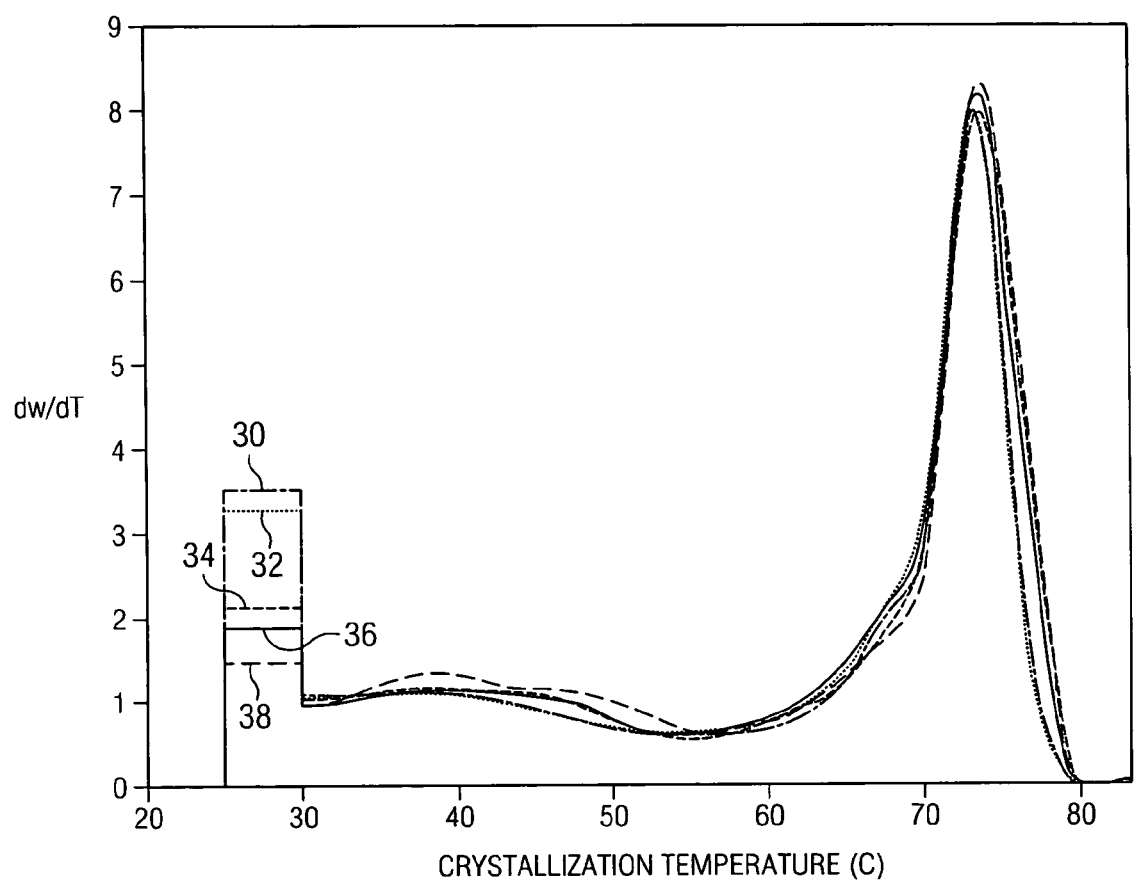
FIG. 3 illustrates CRYSTAF crystallization curves for polymers produced according to a polymerization method utilizing a hafnium metallocene catalyst in the absence of isopentane (30, 32), in the presence of varying levels of isopentane (34, 36, 38), the CRYSTAF data being obtained under different conditions from those in FIGS. 1 and 2.

The inventors have discovered a process in which the composition distribution of a polyolefin can be tailored by adjusting the amount of a condensable fluid that is contacted with the catalyst system and olefins reacted in a fluidized bed gas phase reactor. The invention is not limited to the properties of the polyolefin produced, the catalyst that is used, or the type of fluidized bed reactor. Suitable reactors of this nature are described in, for example, GAS FLUIDIZATION TECHNOLOGY (D. Geldart, ed., John Wiley & Sons 1986), FLUIDIZATION ENGINEERING (D. Kunii & O. Levenspiel, Butterworth-Heinemann 1991), U.S. Pat. No. 5,436,304 and U.S. Pat. No. 5,453,471. The use of condensable fluids is also described in, for example, U.S. Pat. No. 5,436,304. In one embodiment, the catalyst system can be any catalyst system comprising a catalyst component and activators known in the art that are active in polymerizing olefins to form polyolefins such as, but not limited to, vanadium and titanium-based Ziegler-Natta type catalysts, chromium based catalyst systems, metallocene catalyst systems, di- or tri-amide-metal catalyst systems, and other single site catalysts known in the art, such as described in, for example, G. J. P. Britovsek, V. C. Gibson, and D. F. Wass in "The Search for New-Generation Polymerization Catalysts: Life Beyond Metallocenes", 38 ANGEW. CHEM. INT. ED. 428–447 (1999). In another embodiment, the catalyst system that is used is characterized in that the polyolefin produced therefrom has a CDBI value of less than 50%. In a preferred embodiment, the catalyst system useful in the present invention is a Group 4, 5 or 6 metallocene which includes such metals bound to at least one cyclopentadienyl or ligand isolobal to cyclopentadienyl, and more preferably, hafnocenes, and most preferably, bis-cyclopentadienyl type hafnocenes comprising at least one hafnium metal atom bound to two or more cyclopentadienyl ligands or ligands isolobal to cyclopentadienyl.

The present invention can be described in one embodiment as a method of producing a polyolefin comprising contacting in a fluidized bed gas phase reactor an olefin monomer and at least one comonomer with a catalyst system in the presence of a first amount at least one condensable fluid to produce a first polyolefin, followed by contacting a second amount of at least one condensable fluid to produce a second polyolefin; characterized in that when the amount of condensable fluid contacted is changed incrementally from 0 mol % to 30 mol %, the CDBI of the second polyolefin is greater than that of the first polyolefin. By "changed incrementally", it is meant that the amount of condensable fluid is changed by any amount within the range such that the CDBI of the polyolefin generated therein, the "second polyolefin", has a measurable CDBI that is greater than that of the "first polyolefin" that was generated in the reactor prior to the "incremental change" from any initial mol % value within the range to any final mol % value within the range, provided that the final mol % value is greater than the initial mol % value. Thus, an "incremental change" may take place when the reactor is first operated without the presence of condensable fluid, followed by an addition to the reactor of a condensable fluid to a certain steady state level, for example, 2, 4, 6, 8, or 10 mol %, etc. up to 30 wt %, establishing a new steady state of operation at the chosen level of condensable fluid. It should be understood of course that the reverse process also applies in the present invention; that is, when the "incremental change" is from an initial mol % value that is higher than the final mol % value, the CDBI of the polyolefin decreases.

The CDBI may change by any amount. For example, if the initial amount of condensable fluid in the reactor is 0 mol % while producing a first polyolefin having a CDBI value, and the amount of condensable fluid is increased to a level of 2 or 4 or 6 or 8 or 10 or 12 mol %, the CDBI of the second polyolefin produced may increase by from 2 or 4 or 6 or 8 or 10 or 15%, wherein the increase in the CDBI is calculated to be the difference between the CDBI values of the first and second polyolefins (CDBI value of the second polyolefin— CDBI value of the first polyolefin). Stated another way, the CDBI of the polyolefin produced in the method of the invention increases by from 2 to 15% for every 2 to 12 mol % increase in the amount of condensable fluid in one embodiment; in yet another embodiment, the CDBI of the polyolefin produced in the method of the invention increases by from 2 to 10% for every 2 to 5 mol % increase in the amount of condensable fluid; in yet another embodiment, the CDBI of the polyolefin produced in the method of the invention increases by from 2 to 5% for every 2 to 12 mol % increase in the amount of condensable fluid.

Preferably, the "first" and "second" polyolefins refer to the polyolefin as produced under steady-state conditions once the change in conditions, that is, the incremental change in the condensable fluid, has been established either at 0 mol % condensable fluid (prior to the addition of condensable fluid to the reactor) or some level above 0 mol %; and further, the first and second polyolefins are preferably polyethylenes comprising at least 80 wt % ethylene derived units.

In the embodiment wherein the catalyst system used is characterized in that the polyolefin produced therefrom has a CDBI value of less than 50%, the CDBI may change by any absolute value. For example, the CDBI of the first polyolefin produced therefrom may be 20%, and the CDBI of the second polyolefin produced therefrom may be 30% when the amount of condensable fluid is changed incrementally to from any initial value to any higher final value. In a more particular embodiment, when a hafnocene is used as part of the catalyst system, the CDBI of the first polyolefin, preferably polyethylene, may range from 19 to 25% in the absence of condensable fluid, and when condensable fluid is added to the reactor in an amount of from 5 to 10 mol %, the CDBI of the second polyolefin therefrom may range from 24% to 35%.

The invention may be further, or alternately, characterized in that the solubility distribution index (SDBI) of the second polyolefin is less than that of the first polyolefin. For example, for every 1 to 5 mol % increase in the amount of condensable fluid contacted in the reactor, the SDBI of the polyolefin may decrease by an amount ranging from 1 to 20° C. In a more particular embodiment, when a hafnocene is used as part of the catalyst system, the SDBI of the first polyolefin, preferably polyethylene, may range from 19 to 25° C. in the absence of condensable fluid, and when condensable fluid is added to the reactor in an amount of from 5 to 10 mol %, the SDBI of the second polyolefin therefrom may range from 24 to 35° C.

The invention may be further, or alternately, characterized in that the "T<30" value of the second polyolefin is less than that of the first polyolefin. The values indicated for "Tc<30° C." represent that amount (%) of polymer having a temperature of crystallization ("Tc") of less than 30° C. (referred to as the "T<30"). The lower the value of the T<30, the more polymers have crystallized out of solution by 30° C., which indicates a more uniform comonomer distribution. For example, for every 1 to 5 mol % increase in the amount of condensable fluid contacted in the reactor, the T<30 value of the polyolefin may decrease by an amount ranging from 1 to 20%. In a more particular embodiment, when a hafnocene is used as part of the catalyst system, the T<30 of the first polyolefin, preferably polyethylene, may range from 10 to 30% in the absence of condensable fluid, and when condensable fluid is added to the reactor in an amount of from 5 to 10 mol %, the T<30 of the second polyolefin therefrom may range from 1 to 10%.

As a further, or independent, aspect of the invention, the process described herein may include the step of adjusting the concentration of hydrogen as well as adjusting the concentration of the condensable fluid, thus producing a polyolefin having a targeted melt viscosity. In particular, in the embodiment where the catalyst system comprises a hafnocene, the inventors have unexpectedly found that the melt viscosity, as expressed in the $I_2$ or $I_{21}/I_2$ value of the resultant polyolefin, can be tailored in an unexpected manner. In the embodiment of using a hafnocene, in the presence of a condensable fluid to any amount up to 20 mol % in the gas phase fluidized bed reactor, and preferably in an amount from 3 to 12 mol %, the $I_2$ value of the polyolefin decreases when the level of hydrogen increases. For example, when no condensable liquid is present in the reactor when using a catalyst system comprising a hafnocene, and hydrogen is present a first amount, a first polyolefin is produced; and when an amount of condensable liquid is then added to the reactor, hydrogen may then be added in a second amount such that the second amount is greater than the first amount, characterized in that the $I_2$ of the second polyolefin produced therefrom is lower than that of the first polyolefin. The hydrogen may be added in any amount to the reactor as described herein, for example, expressed as an amount relative to the level of primary olefin monomer, preferably ethylene, at from 1 to 20 ppm $H_2/C_2$ mol % in one embodiment, and from 1.5 to 10 ppm $H_2/C_2$ mol % in another embodiment, and from 2 to 6 ppm $H_2/C_2$ mol % in yet another embodiment, while the polyolefin, preferably a polyethylene copolymer, possesses an I2 value ranging from 0.2 to 10 dg/min in one embodiment, and from 0.5 to 6 dg/min in another embodiment, and from 0.7 to 4 dg/min in yet another embodiment.

As used herein, the phrase "catalyst system" includes at least one "catalyst component" and at least one "activator", both of which are described further herein. The activator may associate with the catalyst component by any means known to those skilled in the art. The catalyst system may also include other components, such as supports, etc., and is not limited to the catalyst component and/or activator alone or in combination.

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

Composition distribution is also referred to by those of ordinary skill in the art as "comonomer distribution" or "short chain branching distribution", and each of these terms is interchangeable herein.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms selected from the group consisting of boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like.

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls include, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

As used herein, structural formulas are employed as is commonly understood in the chemical arts; lines ("-") used to represent associations between a metal atom ("M", Group 3 to Group 12 atoms) and a ligand, ligand atom or atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

A certain stereochemistry for a given structure or part of a structure should not be implied unless so stated for a given structure or apparent by use of commonly used bonding symbols such as by dashed lines and/or heavy lines.

Unless stated otherwise, no embodiment of the present invention is herein limited to the oxidation state of the metal atom "M" as defined below in the individual descriptions and examples that follow. The ligation of the metal atom "M" is such that the compounds described herein are neutral, unless otherwise indicated.

As stated above, the catalyst system useful in the present invention is not limited, and may include any catalyst system known to those in the art suitable for polymerizing olefins. In a preferred embodiment, the catalyst system useful in the present invention includes at least one metallocene catalyst component ("metallocene"), and more particularly, a Group 4, 5 or 6 metallocene. Metallocene catalyst components are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243–296 (1999) and in particular, for use in the synthesis of polyethylene in 1 METALLOCENE-BASED POLYOLEFINS 261–377 (2000). The metallocene catalyst components as described herein include "half sandwich" or "full sandwich" compounds having one, two or more Cp ligands (cyclopentadienyl and ligands isolobal to cyclopentadienyl) bound to at least one Group 4, 5 or 6 metal atom ("M"), and one or more leaving group(s) bound to the at least one metal atom ("M"). The metallocene catalyst component is supported on a support material in a particular embodiment as described further below, and may be supported with or without another catalyst component.

Preferably, the metal atom "M" of the metallocene catalyst component, as described throughout the specification and claims comprises hafnium ("Hf"), thus forming a "hafnocene" comprising at least one cyclopentadienyl ligand or ligand isolobal to cyclopentadienyl.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl, cyclopentaphenanthreneyl, benzindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4$Ind"), substituted versions thereof (as described in more detail below), and heterocyclic versions thereof.

In one aspect of the invention, the one or more metallocene catalyst components of the invention are represented by the formula (I):

$$Cp^A Cp^B MX_n \qquad (I)$$

wherein M is as described above; each X is chemically bonded to M; each Cp group is chemically bonded to M; and n is 2 in a particular embodiment.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) as well as ring substituents in structures (IIIa–d) include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. Preferably R groups include methyl, ethyl, propyl, butyl, pentyl, and isomers thereof.

Each X in the formula (I) above and for the formulas/structures (II) through (V) below is independently selected from the group consisting of: any leaving group in one embodiment; halogen ions (fluorine, chlorine, bromine, iodide), hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment; and fluoride in yet a more particular embodiment.

In another aspect of the invention, the metallocene catalyst component includes those of formula (I) where $Cp^A$ and $Cp^B$ are bridged to each other by at least one bridging group, (A), such that the structure is represented by formula (II):

$$Cp^A(A)Cp^B MX_n \qquad (II)$$

These bridged compounds represented by formula (II) are known as "bridged metallocenes". $Cp^A$, $Cp^B$, M, X and n in structure (II) are as defined above for formula (I); and wherein each Cp ligand is chemically bonded to M, and (A) is chemically bonded to each Cp. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $-Si(R')_2Si(R'_2)-$, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

The ligands $Cp^A$ and $Cp^B$ of formulae (I) and (II) are different from each other in one embodiment, and the same in another embodiment.

In another aspect of the invention, the at least one metallocene catalyst component can be described more particularly in structures (IIIa), (IIIb), (IIIc), (IIId) and (IIIe):

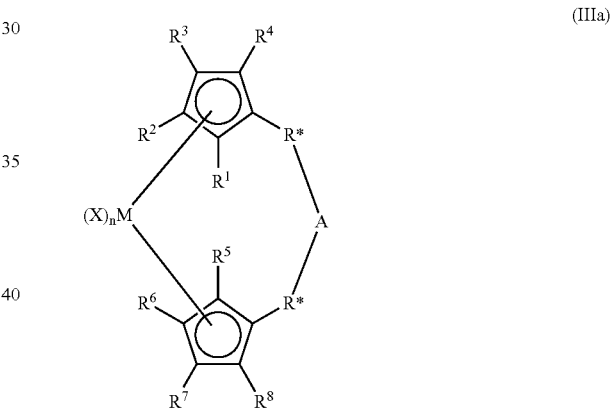

(IIIa)

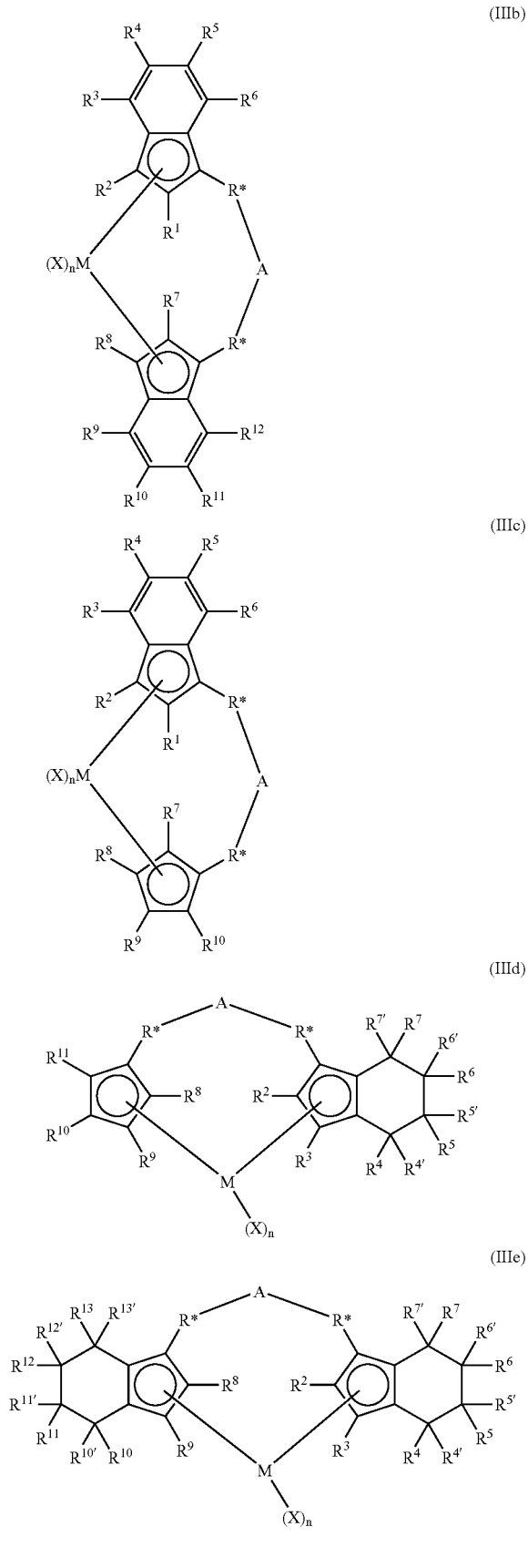

wherein in structures (IIIa) to (IIIe), M is a Group 4, 5 or 6 metal, preferably Hf;

wherein each R* is independently: selected from the group consisting of hydrocarbylenes and heteroatom-containing hydrocarbylenes in one embodiment; and selected from the group consisting of alkylenes, substituted alkylenes and heteroatom-containing hydrocarbylenes in another embodiment; and selected from the group consisting of $C_1$ to $C_{12}$ alkylenes, $C_1$ to $C_{12}$ substituted alkylenes, and $C_1$ to $C_{12}$ heteroatom-containing hydrocarbylenes in a more particular embodiment; and selected from the group consisting of $C_1$ to $C_4$ alkylenes in yet a more particular embodiment; and wherein both R* groups are identical in another embodiment;

A is as described above for (A) in structure (II), and more particularly, selected from the group consisting of a chemical bond, —O—, —S—, —$SO_2$—, —NR—, =$SiR_2$, =$GeR_2$, =$SnR_2$, —$R_2SiSiR_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one embodiment; and selected from the group consisting of $C_5$ to $C_8$ cyclic hydrocarbons, —$CH_2CH_2$—, =$CR_2$ and =$SiR_2$ in a more particular embodiment; and wherein R is selected from the group consisting of alkyls, cycloalkyls, aryls, alkoxys, fluoroalkyls and heteroatom-containing hydrocarbons in one embodiment; and R is selected from the group consisting of $C_1$ to $C_6$ alkyls, substituted phenyls, phenyl, and $C_1$ to $C_6$ alkoxys in a more particular embodiment; and R is selected from the group consisting of methoxy, methyl, phenoxy, and phenyl in yet a more particular embodiment; wherein A may be absent in yet another embodiment, in which case each R* is defined as for $R^1$—$R^{13}$;

each X is as described above in (I);

n is 2 in yet another embodiment; and $R^1$ through $R^{13}$ (and $R^{4'}$ through $R^{7'}$ and $R^{10'}$ through $R^{13'}$) are independently: selected from the group consisting of hydrogen radical, halogen radicals, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in one embodiment; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups in yet a more particular embodiment; wherein adjacent R groups may form a ring, either saturated, partially saturated, or completely saturated.

In a particular embodiment of the metallocene represented in structure (IIIc), $R^1$ and $R^2$ form a conjugated 6-membered carbon ring system that may or may not be substituted.

Non-limiting examples of metallocene catalyst components consistent with the description herein include:
bis(n-propylcyclopentadienyl)hafnium $X_n$,
bis(n-butylcyclopentadienyl)hafnium $X_n$,
bis(n-pentylcyclopentadienyl)hafnium $X_n$,
(n-propyl cyclopentadienyl)(n-butyl cyclopentadienyl) hafnium $X_n$,
bis[(2-trimethylsilylethyl)cyclopentadienyl]hafnium $X_n$,
bis(trimethylsilyl cyclopentadienyl)hafnium $X_n$,
bis(2-n-propylindenyl)hafnium $X_n$,
bis(2-n-butylindenyl)hafnium $X_n$, dimethylsilylbis(n-propylcyclopentadienyl)hafnium $X_n$,
dimethylsilylbis(n-butylcyclopentadienyl)hafnium $X_n$,
is(9-n-propylfluorenyl)hafnium $X_n$,
bis(9-n-butylfluorenyl)hafnium $X_n$,
(9-n-propylfluorenyl)(2-n-propylindenyl)hafnium $X_n$,
bis(1-n-propyl-2-methylcyclopentadienyl)hafnium $X_n$,
(n-propylcyclopentadienyl)(1-n-propyl-3-n-butylcyclopentadienyl)hafnium $X_n$, and derivatives thereof.

By "derivatives thereof", it is meant any substitution or ring formation as described above for structures (Va–Ve); and in particular, replacement of the "X" group with any of $C_1$ to $C_5$ alkyls, $C_6$ aryls, $C_6$ to $C_{10}$ alkylaryls, fluorine or chlorine, and n is 2.

It is contemplated that the metallocene catalyst components described above include their structural or optical or enantiomeric isomers (racemič mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components. In one embodiment, the metallocenes described herein are in their rac form.

The "metallocene catalyst component" useful in the present invention may comprise any combination of any "embodiment" described herein.

Preferably, the metallocene catalyst component is a hafnium metallocene catalyst ("hafnocene"), and catalyst systems according to the present embodiments are referred to herein as hafnium metallocene catalyst systems. Exemplary hafnium metallocene catalysts and techniques for their preparation are described in U.S. Pat. No. 6,242,545 and/or U.S. Pat. No. 6,248,845 and/or U.S. Pat. No. 6,528,597. According to certain ones of the present embodiments, the hafnium metallocene catalyst component is one of bis(n-propylcyclopentadienyl)hafnium $X_n$, bis(n-butylcyclopentadienyl)hafnium $X_n$, or bis(n-pentylcyclopentadienyl)hafnium $X_n$, where X is one of chloride or fluoride and n is 2. According to still other embodiments, the hafnium metallocene catalyst is one of bis(n-propylcyclopentadienyl)hafnium difluoride and bis(n-propylcyclopentadienyl)hafnium dichloride. In a particular embodiment, the catalyst system comprises a metallocene, the metallocene selected from the group consisting of hafnocenes.

Additionally, in still other embodiments, the hafnium metallocene catalyst component is used in a supported form. For example, the hafnium metallocene catalyst is deposited on, bonded to, contacted with, or incorporated within, adsorbed or absorbed in, or on, a support or carrier. In one such embodiment, the metallocene catalyst is introduced onto a support by slurrying a pre-supported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g. Kaydol® or Drakol®) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst.

As used herein, the term "activator" refers to any compound or combination of compounds, supported or unsupported, which is capable of activating a metallocene catalyst compound towards olefin polymerization. Embodiments of such activators include Lewis acids such as cyclic or oligomeric poly(hydrocarbylaluminum oxides) ("aluminoxanes", e.g., methalumoxane or "MAO"), other alkylaluminum compounds (e.g., trimethylaluminum, triethylaluminum), and so called non-coordinating activators ("NCA") (alternately, "ionizing activators" or "stoichiometric activators").

Methalumoxane and other aluminoxane activators are well known in the art, and their use with metallocenes described in, for example, U.S. Pat. No. 4,897,455, and methods of making these activators is disclosed in, for example, U.S. Pat. No. 5,739,368. Toluene-soluble species of aluminoxane, such as methalumoxane, are preferred in the present invention. An example of a suitable activator is methalumoxane available as a toluene solution from Albemarle Corp. Stoichiometric activators are also well known in the art and are described by, for example, E. Y.-X. Chen & T. J. Marks, *Cocatalysts for Metal-Catalyzed Olefin Polymerization: Activators, Activation Processes, and Structure-Activity Relationships* 100(4) CHEMICAL REVIEWS 1391–1434 (2000). An example of a neutral stoichiometric activators includes tris(perfluorophenyl)boron and its aluminum equivalent. Examples of ionic stoichiometric activators include triethylammonium tetra(phenyl)boron, N,N-dimethylanilinium tetra(phenyl)boron, and triphenylcarbonium tetra(phenyl)boron, and their aluminum equivalents.

When the activator is a cyclic or oligomeric poly(hydrocarbylaluminum oxide), the mole ratio of activator to metallocene catalyst compound metal preferably ranges from 20:1 to 300:1, and most preferably from 150:1 to 1:1. When the activator is a neutral or ionic ionizing activator, the mole ratio of activator to metallocene catalyst compound ranges from 0.5:1 to 10:1 in one embodiment, and from 1:1 to 5:1 in yet another embodiment.

A support may also be present as part of the catalyst system of the invention. Supports, methods of supporting activators and catalysts, modifying the support, and activating supports for single-site catalyst such as metallocenes is discussed in, for example, 1 METALLOCENE-BASED POLYOLEFINS 173–218 (J. Scheirs & W. Kaminsky eds., John Wiley & Sons, Ltd. 2000) and G. G. Hlatky, *Heterogeneous Single-Site Catalysts for Olefin Polymerization* 100(4) CHEMICAL REVIEWS 1347–1374 (2000). The terms "support" or "carrier", as used herein, are used interchangeably. Non-limiting examples of support materials include inorganic oxides and inorganic halides, talc, clay, silica, alumina, magnesia, zirconia, iron oxides, boria, calcium oxide, zinc oxide, barium oxide, thoria, and aluminum phosphate. In a preferred embodiment, the carriers useful in the invention are selected from inorganic oxides that include Group 2, 3, 4, 5, 13 and 14 oxides and halides; and more particularly, carriers selected from silica, alumina, silica-alumina, magnesium chloride, and mixtures thereof. Preferably, the average particle size of the support has a value in the range of from 0.1 to 60 μm. Examples of suitable supports include Davison 948 and 955 silicas and Crosfield ES-757 silica. Dehydration or calcining of the support may or may also be carried out. Suitable calcining temperatures range from 600° C. to 1200° C. in one embodiment and may take place in the absence or presence of oxygen and moisture.

In one preferred embodiment, at least one of the class of metallocene catalyst compounds of the invention is supported on a carrier; and in a more preferred embodiment a metallocene consisting essentially of any one metallocene catalyst compound represented in the class of compounds of formula (I) or (II) is supported on a carrier. In another preferred embodiment, the metallocene catalyst compound and activator are both supported on a carrier; and in another preferred embodiment, the catalyst system useful in the invention consists essentially of one of the class of metallocene catalyst compounds, an activator and a carrier.

The support may be contacted with the other components of the catalyst system in any number of ways. In one embodiment, the support is contacted with the activator to form an association between the activator and support, or a "supported activator". In another embodiment, the metallocene catalyst compound is contacted with the support to form a supported metallocene. In yet another embodiment, the support may be contacted with the activator and catalyst compound together, or with each partially in any order. The components may be contacted by any suitable means as in solution, slurry, or solid form, or some combination thereof, and may be heated when contacted to from 25° C. to 250° C. Diluents that may be used to make the catalyst systems described herein can be removed by any suitable means such as evaporation by heating, in vacuo, spray drying, etc. In one embodiment, the catalyst system is maintained in a diluent and used in the polymerization process in slurry or solution form in such a diluent, the diluent comprising alkanes, halogenated alkanes, aromatic hydrocarbons, mineral or silicon oils, or a combination therein.

The polymerization process of the present invention may be carried out using any suitable fluidized bed process. A particularly desirable method for producing polyolefin polymers according to the present invention is a gas phase polymerization process preferably utilizing a fluidized bed reactor. This type reactor and means for operating the reactor are well known and completely described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

In one embodiment, the polymerization process of the present invention may be effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

The reactor temperature of the fluid bed process herein ranges from 30° C. to the highest temperature that is feasible, taking into account the sintering temperature of the polymer product within the reactor, and more preferably from 40° C. to 120° C., and even more preferably from 50° C. to 100° C., and even more preferably from 60° C. to 90° C. Regardless of the process used to make the polyolefins of the invention, the polymerization temperature, or reaction temperature should be below the melting or "sintering" temperature of the polymer to be formed. Thus, the upper temperature limit in one embodiment is the melting temperature of the polyolefin produced in the reactor.

Well-known conventional gas phase polymerizations processes as described above are also operable in a "condensed mode", including the so-called "induced condensed mode". Condensed mode polymerizations processes are disclosed in U.S. Pat. Nos. 4,543,399; 4,588,790; 4,994,534; 5,352,749; and 5,462,999, which describe polymerization processes wherein a recycle stream, or a portion thereof, is cooled to a temperature below the dew point in a fluidized bed polymerization process, resulting in condensing all or a portion of the recycle stream. The recycle stream is returned to the reactor. To increase the dewpoint of the recycle stream, the recycle stream may include one or more condensable fluids, which can be introduced into the reaction/recycle system at any point in the system. Suitable condensable fluids include saturated or unsaturated hydrocarbons. Examples of suitable condensable fluids include saturated hydrocarbons containing 2 to 8 carbon atoms (e.g., ethane, propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). The condensable fluid may also include polymerizable condensable comonomers such as olefins, alpha-olefins, diolefins, diolefins containing at least one alpha olefin, and mixtures thereof.

Other known gas phase polymerization processes suitable for use with the present embodiments include the so-called "liquid monomer" process. An exemplary liquid monomer process is described in U.S. Pat. No. 6,096,840, which describes an enhanced dry-mode operation where a condensable liquid is added to the reactor with benefits, but no condensing is achieved.

According to certain of the present embodiments, a condensed mode gas phase polymerization process is operated with a polymerization catalyst comprising a hafnium metallocene catalyst component, such as bis(n-propylcyclopentadienyl)hafnium difluoride, and a condensable fluid comprising a saturated hydrocarbon containing 2 to 8 carbon atoms selected from the group consisting of ethane, propane, n-butane, isobutane, n-pentane, isopentane, neopentane, n-hexane, isohexane, n-heptane, n-octane, and mixtures thereof. In a further embodiment, the condensable fluid is isopentane. The condensable fluid is present in the polymerization reactor in a range of from 0.1 to 30 mol % (relative to the gas phase composition) in one embodiment, and present in a range of 1 to 20 mol % in another embodiment, and present in a range of from 2 to 18 mol % in another embodiment, and present in a range of from 4 to 12 mol % in another embodiment, and present in a range of from 6 to 10 mol % in yet another embodiment, wherein a desirable range includes any combination of any upper limit with any lower limit as described herein. The reported values of condensable fluid in "mol %" are relative to the steady-state composition of gas in the polymerization reactor. Therefore, the "mol %" values are a percentage of the total gaseous hydrocarbons, which are ethylene and a $C_3$ to $C_{12}$ α-olefin comonomer in one embodiment, as well as non-hydrocarbon gases which would include hydrogen and nitrogen. The reported values do not take into account the amounts of hydrocarbons or other gases that may be dissolved in the polymer granules.

Further, it is common to use a staged reactor employing two or more reactors in series, wherein one reactor may produce, for example, a high molecular weight component and another reactor may produce a low molecular weight component. In one embodiment of the invention, the polyolefin is produced using a staged gas phase reactor. Such commercial polymerization systems are described in, for example, 2 METALLOCENE-BASED POLYOLEFINS 366–378 (John Scheirs & W. Kaminsky, eds. John Wiley & Sons, Ltd. 2000); U.S. Pat. No. 5,665,818, U.S. Pat. No. 5,677,375; U.S. Pat. No. 6,472,484; EP 0 517 868 and EP-A-0 794 200.

In another embodiment, one or all of the catalysts are combined with up to 10 wt % of a metal-fatty acid compound, such as, for example, an aluminum -stearate, -octoates -oleate, -cyclohexylbutyrates, etc., based upon the weight of the catalyst system (or its components), such as disclosed in U.S. Pat. Nos. 6,300,436 and 5,283,278. Suitable metals for forming a metal-fatty acid compound include other Group 2 and Group 5–13 metals. In an alternate embodiment, a solution or slurry of the metal-fatty acid compound is fed into the reactor. In yet another embodiment, the metal-fatty acid compound is mixed with the catalyst and fed into the reactor separately. These agents may be mixed with the catalyst or may be fed into the reactor in a solution or a slurry with or without the catalyst system or its components.

In another embodiment, the supported catalyst(s) are combined with the activators and are combined, such as by tumbling and other suitable means, with up to 2.5 wt % (by weight of the catalyst composition) of an antistatic agent, such as an ethoxylated or methoxylated amine, an example of which is Kemamine AS-990 (ICI Specialties, Bloomington Del.).

According to certain of the present embodiments, polyethylene is produced from an ethylene monomer in the presence of at least one comonomer. According to other of the present embodiments, polypropylene is produced from a propylene monomer in the presence of at least one comonomer. The comonomer(s) may be present at any level with the ethylene or propylene monomer that will achieve the desired weight percent incorporation of the comonomer into the finished resin. According to the present embodiments, a method for controlling the incorporation of the comonomer into the finished polymer resin is provided by employing a hafnium metallocene catalyst component and a condensable fluid in the polymerization process.

In one embodiment of polyethylene production, the comonomer is present with ethylene in a mole ratio range of from 0.0001 (comonomer:ethylene) to 50, and from 0.0001 to 5 in another embodiment, and from 0.0005 to 1.0 in yet another embodiment, and from 0.001 to 0.5 in yet another embodiment, and from 0.010 to 0.030 in yet a more particular embodiment. In particular examples described herein, the comonomer is 1-hexene or 1-butene, and the mole ratio of hexene to ethylene is in the range of 0.0140 to 0.0165.

Expressed in absolute terms (psia), in making polyethylene, the amount of ethylene present in the polymerization reactor may range up to 735 psia (50 atmospheres) pressure in one embodiment, up to 367.5 psia (25 atmospheres) pressure in another embodiment, up to 294 psia (20 atmospheres) pressure in yet another embodiment, up to 264.6 psia (18 atmospheres) in yet another embodiment, up to 240 psia (16.3 atmospheres) in yet another embodiment, up to 220 psia (15 atmospheres) in yet another embodiment, up to 205.8 psia (14 atmospheres) in yet another embodiment, and up to 176.4 psia (12 atmospheres) in yet another embodiment, and up to 147 psia (10 atmospheres) in yet another embodiment.

The processes of the present embodiments are suitable for the production of copolymers, terpolymers, and the like, of olefins, particularly ethylene, and at least one or more other olefin(s). Preferably, the olefins are α-olefins. The olefins, for example, may contain from 2 to 16 carbon atoms in one embodiment; ethylene and a comonomer comprising from 3 to 12 carbon atoms in another embodiment; and ethylene and a comonomer comprising from 4 to 10 carbon atoms in yet another embodiment; and ethylene and a comonomer comprising from 4 to 8 carbon atoms in yet another embodiment. Particularly preferred for preparation according to the present embodiments are polyethylenes. Exemplary olefins that may be utilized herein are ethylene, propylene, 1-butene, 1-pentene, 1-hexene, 1-heptene, 1-octene, 4-methyl-1-pentene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohexene-1,1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

Hydrogen gas is often used in olefin polymerization to control the final properties of the polyolefin, such as described in POLYPROPYLENE HANDBOOK 76–78 (Hanser Publishers, 1996). It is known that increasing concentrations (partial pressures) of hydrogen increase the melt flow ratio ($I_{21}/I_2$) and/or melt index ($I_2$) of the polyolefin generated. The $I_{21}/I_2$ and $I_2$ are measurements of rheological properties of a polyolefin, in particular, the melt viscosity of the polyolefin. $I_{21}/I_2$ and $I_2$ are influenced by the hydrogen concentration used in practicing the methods of the present embodiments.

In a particular embodiment, when the catalyst system comprises a hafnocene, the present embodiments provide a method for controlling the melt viscosity of a polyolefin produced by a polymerization process that uses a hafnium metallocene catalyst and a condensable fluid, each as described herein. Examples herein illustrate that polymers produced according to a polymerization process that uses a hafnium metallocene catalyst and a condensable fluid have a lower melt index than the same polymers produced according to a conventional polymerization process (in the absence of a condensable fluid), even when the hydrogen concentration in the polymerization process is greater than the hydrogen concentration in the conventional polymerization process. The lowering of the melt index in the process of the present embodiments is unexpected because, as known to those of ordinary skill in the art, the melt index of a polymer typically increases with increasing hydrogen concentration under which the polymer was formed. Accordingly, the present embodiments unexpectedly provide a method for controlling the melt viscosity of a polymer. To attain a targeted melt viscosity when practicing a polymerization process that uses a hafnium metallocene catalyst and a condensable fluid, the hydrogen concentration in the reactor can be increased, or decreased, accordingly. In light of the teachings herein with respect to a polymerization process that uses a hafnium metallocene catalyst and a condensable fluid, those of ordinary skill in the art can determine, through the exercise of routine experimentation, appropriate adjustments to make to the hydrogen concentration to attain a targeted melt viscosity.

The amount of hydrogen used in the polymerization process can be expressed as a ratio relative to the total polymerizable monomer, for example, ethylene, or a blend of ethylene and hexene or propene. The amount of hydrogen used in the polymerization process of the present invention is an amount necessary to achieve the desired $I_{21}/I_2$ or $I_2$ of the final polyolefin resin. In certain embodiments herein where ethylene is the monomer, the ratio of hydrogen concentration (ppm) to monomer concentration (mol %) is less than 10. In one embodiment, the ratio of hydrogen concentration (ppm) to monomer concentration (mol %) ranges from 1 to 15, and from 2 to 10 in another embodiment, and from 3 to 8 in yet another embodiment, wherein a desirable range includes any upper limit with any lower limit described herein. Expressed another way, in examples herein, the amount of hydrogen in the reactor at any time is in a range of from 200 to 320 ppm.

According to certain examples of the present methods, polymers are produced from gas phase reactors that are operated in the presence of a hafnium metallocene catalyst and a condensable fluid. According to such examples, the polymers produced have a density in the range of from 0.90 to 0.94 g/cm$^3$, a melt index in the range of from 0.30 to 2 g/10 min., a melt index ration in the range of from 15 to 40, a composition distribution breadth index (CDBI) of less than 50 or 40%, a solubility distribution index (SDBI) less than 30° C. and a T<30 of less than 20%.

The broadly described properties of the polyolefins produced from the process of the invention may be described by any number of parameters and may depend upon the catalyst system used. In a preferred embodiment, the polymers produced herein are polyethylene polymers, the polyethylene polymers comprising up to 20 wt % $C_3$ to $C_{12}$ olefin derived units and having a density of from 0.90 to 0.94 g/cm$^3$, more preferably a density of from 0.91 to 0.93 g/cm$^3$. The polyethylenes can also be characterized in another embodiment as having a CDBI value of from 5 to 100% in one embodiment, and from 10 to 50% in another embodiment, and from 15 to 40% in yet another embodiment, and from 20 to 35% in yet another embodiment, wherein a desirable range of CDBI comprises any combination of any upper limit with any lower limit described herein. The polyethylenes can also be characterized in another embodiment as having an $I_2$ (2.16 kg/190° C.) of from 0.01 to 50 g/10 min in one embodiment, and from 0.1 to 50 g/10 min in one embodiment, and from 0.2 to 20 g/10 min in another embodiment, and from 0.4 to 10 g/10 min in yet another embodiment, and from 0.6 to 1.5 g/10 min in yet another embodiment and from 0.6 to 5 g/10 min in yet another embodiment, wherein a desirable range of $I_2$ comprises any combination of any upper limit with any lower limit described herein. The polyethylenes can also be characterized in another embodiment as having an $I_{21}/I_2$ (21.6 kg/2.16 kg; 190° C.) of from 10 to 100 in one embodiment, and from 15 to 60 in another embodiment, and from 20 to 50 in yet another embodiment, and from 22 to 45 in yet another embodiment and from 27 to 35 in yet another embodiment, wherein a desirable range of $I_{21}/I_2$ comprises any combination of any upper limit with any lower limit described herein. The polyethylenes can also be characterized in another embodiment as having a T<30 of from 0 to 30% in one embodiment, and from 2 to 25% in yet another embodiment, and from 4 to 20% in yet another embodiment.

In a particular embodiment, when the catalyst system used in the process of the invention comprises a hafnocene, at least one component of the the first and second polyolefins have a bimodal composition distribution that is recognizable in a crystallization analysis fractionation ("CRYSTAF") curve by at least a first peak that is separated by a spread from a second peak; wherein the spread is in the range of from 20 to 45 degrees in one embodiment, and from 25 to 40 degrees in another embodiment, and from 27 to 35 degrees in yet another embodiment.

The polyolefins of the present invention may be blended with additives known to those of ordinary skill in the art to form compositions that can then be used in articles of manufacture. Those additives include antioxidants, nucleating agents, acid scavengers, plasticizers, stabilizers, anticorrosion agents, blowing agents, other ultraviolet light absorbers such as chain-breaking antioxidants, etc., quenchers, antistatic agents, slip agents, pigments, dyes and fillers and cure agents such as peroxide.

Exemplary antioxidants and stabilizers include organic phosphites, hindered amines; and phenolic antioxidants. Non-limiting examples of suitable organic phosphites include tris(2,4-di-tert-butylphenyl)phosphite (IRGAFOS 168) and di(2,4-di-tert-butylphenyl)pentaerithritol diphosphite (ULTRANOX 626). Non-limiting examples of suitable hindered amines include poly[2-N,N'-di(2,2,6,6-tetramethyl-4-piperidinyl)-hexanediamine-4-(1-amino-1,1,3,3-tetramethylbutane)symtriazine] (CHIMASORB 944); bis(1,2, 2,6,6-pentamethyl-4-piperidyl)sebacate (TINUVIN 770). Non-limiting examples of suitable phenolic antioxidants include octadecyl 3,5di-t-butyl-4-hydroxyhydrocinnamate (IRGANOX 1076) pentaerythrityl tetrakis(3,5-di-tert-butyl-4-hydroxyphenyl) propionate (IRGANOX 1010); and 1,3, 5-Tri(3,5-di-tert-butyl-4-hydroxybenzyl-isocyanurate (IRGANOX 3114).

With respect to the physical process of producing the blend of polyolefin and one or more additives, sufficient mixing should take place to assure that a uniform blend will be produced prior to conversion into a finished product. The polyolefin can be in any physical form when used to blend with the one or more additives. In one embodiment, reactor granules, defined as the granules of polymer that are isolated from the polymerization reactor, are blended with the additives. Alternately, the polyolefin is in the form of pellets, which are formed from melt extrusion of the reactor granules.

One method of blending the additives with the polyolefin is to contact the components in a tumbler or other physical blending means, the polyolefin being in the form of reactor granules. This can then be followed, if desired, by melt blending in an extruder. Another method of blending the components is to melt blend the polyolefin pellets with the additives directly in an extruder, Brabender or any other melt blending means.

The resultant polyolefin and polyolefin compositions made according to methods of the present embodiments may be further processed by any suitable means such as by calendering, casting, coating, compounding, extrusion, foaming; all forms of molding including compression molding, injection molding, blow molding, rotational molding, and transfer molding; film blowing or casting and all methods of film formation to achieve, for example, uniaxial or biaxial orientation; thermoforming, as well as by lamination, pultrusion, protrusion, draw reduction, spinbonding, melt spinning, melt blowing, and other forms of fiber and nonwoven fabric formation, and combinations thereof. These and other forms of suitable processing techniques are described in, for example, PLASTICS PROCESSING (Radian Corporation, Noyes Data Corp. 1986).

Thus, the compositions of the present invention can be described alternately by any of the embodiments disclosed herein, or a combination of any of the embodiments described herein. Embodiments of the invention, while not meant to be limited by, may be better understood by reference to the following examples and FIGS. 1–3.

EXAMPLES

Example 1

Preparation of Catalysts

Preparation of Bis(propylcyclopentadienyl)hafnium dichloride: $(PrCp)_2HfCl_2$.

$HfCl_4$ (30.00 g, 93.7 mmol, 1.00 equiv.) was added to ether (400 mL) at −35° C. and stirred to give a white suspension. The suspension was re-cooled to −35° C. and then lithium propylcyclopentadienide (21.38 g, 187 mmol, 2.00 equiv.) was added in portions. The reaction turned light brown and became thick with suspended solids on adding the lithium propylcyclopentadienide. The reaction was allowed to warm slowly to room temperature and stirred 17 hours. The brown mixture was filtered to give brown solid and a straw yellow solution. The solid was washed with ether (3×50 mL) and the combined ether solutions were concentrated to ~100 mL under vacuum to give a cold, white suspension. Off-white solid was isolated by filtration and dried under vacuum. Yield 33.59 g (77%). $^1$H NMR $(CD_2Cl_2)$: δ 0.92 (t, 6H, $CH_2CH_2CH_3$), 1.56 (m, 4H, $CH_2CH_2CH_3$), 2.60 (t, 4H, $CH_2CH_2CH_3$), 6.10 (m, 4H, Cp-H), 6.21 (m, 4H, Cp-H).

Preparation of Bis(propylcyclopentadienyl)hafnium difluoride: $(PrCp)_2HfF_2$.

To a murky green-brown solution of bis(propylcyclopentadienyl)hafnium dichloride (70.00 g, 151 mmol, 1.00 equiv.) in dichloromethane (350 mL) was added tributyltin fluoride (98.00 g, 317 mmol, 2.10 equiv.). The reaction was lighter amber after stirring 10 min. The reaction was stirred 130 minutes and then filtered through celite to give an amber solution and off-white solid. The solid was washed with dichloromethane and the combined dichloromethane solution was evaporated under vacuum, leaving a soupy manila mixture. Pentane (1 L) was added to the mixture, which was stirred 10 minutes and cooled to −35° C. The resulting off-white solid was filtered and washed with cold pentane (3×75 mL) and dried under vacuum to give a white powder. Yield 56.02 g (86%). $^1$H $NMR(CD_2Cl_2)$: δ 0.92 (t, 6H, $CH_2CH_2CH_3$), 1.55 (m, 4H, $CH_2CH_2CH_3$), 2.47 (t, 4H, $CH_2CH_2CH_3$), 6.00 (m, 4H, Cp-H), 6.23 (m, 4H, Cp-H). $^{19}$F $NMR(CD_2Cl_2)$: δ 23.9.

Preparation of Active Catalyst

The active catalysts were made at Al/Hf mole ratios of 120:1 and 80:1, and the hafnium loading on the finished catalyst was 0.685 wt % Hf using the following general procedure. Methylaluminoxane (MAO) 1140 cc of a 30 wt % solution in toluene (obtained from Albemarle Corporation, Baton Rouge, La.) was added to a clean, dry 2 gallon vessel and stirred at 60 rpm and 80° F. for 5–15 min. An additional 1500–1800 cc of toluene was added while stirring. The metallocene was dissolved in 250 cc toluene and the transfer vessel was rinsed with an additional 150 cc of toluene. The metallocene/MAO mixture was stirred at 120 rpm for 1 hour. Next, 850 g of silica, Ineos 757 (Ineos Silicas Limited, Warrington, England, dehydrated at 600° C.) was added and stirred for 55 min. The catalyst was then dried at 155° F. for 10 hours under flowing nitrogen while being stirred at 30 rpm.

Examples 2–3

Polymer Production

Examples 2–3 are polyethylene polymers that were polymerized in a single gas phase reactor using a bis(propylcyclopentadienyl)hafnium difluoride catalyst and an Al:Hf ratio of 80:1, prepared as described in Example 1. The polymerizations were conducted according to the conditions listed in Table I.

Example 2 illustrates polymers produced according to the methods of the present embodiments, while Example 3 provides a control for comparison.

The Bed Temp. reported in Table I is the bed temperature of polymerization. Hexene was the comonomer, and the $C_6/C_2$ Ratio is the gas phase hexene/ethylene concentration ratio. The $H_2$ concentration reported in the table is the amount of hydrogen (ppm) in the reactor. The $H_2/C_2$ ratio is the ratio of the hydrogen concentration (ppm) to the ethylene concentration (mol %).

The ethylene/1-hexene copolymers of Examples 2 and 3 were produced in accordance with the following general procedure. Polymerization was conducted in a 14 inch diameter gas-phase fluidized bed reactor operating at approximately 350 psig total pressure. The reactor bed weight was approximately 100 pounds. Fluidizing gas was passed through the bed at a velocity of approximately 2.0 feet per second. The fluidizing gas exiting the bed entered a resin disengaging zone located at the upper portion of the reactor. The fluidizing gas then entered a recycle loop and passed through a cycle gas compressor and water-cooled heat exchanger. The shell side water temperature was adjusted to maintain the reaction temperature to the specified value. Ethylene, hydrogen, 1-hexene and nitrogen were fed to the cycle gas loop just upstream of the compressor at quantities sufficient to maintain the desired gas concentrations. Gas concentrations were measured by an on-line vapor fraction analyzer. The catalyst was fed to the reactor bed through a stainless steel injection tube at a rate sufficient to maintain the desired polymer production rate. Nitrogen gas was used to disperse the catalyst into the reactor. Product was withdrawn from the reactor in batch mode into a purging vessel before it was transferred into a product drum. Residual catalyst and cocatalyst in the resin was deactivated in the product drum with a wet nitrogen purge.

According to Example 2, isopentane, as a condensable fluid, was also a separate feed into the reactor. Isopentane was fed to the reactor at a rate sufficient to maintain the mole percentage in the reactor as reported in Table I.

TABLE I

| Condition | Example 2 | Example 3 |
|---|---|---|
| Bed Temp. (° C.) | 77 | 77 |
| Partial Pressure of Ethylene (psia) | 220 | 220 |
| $C_6/C_2$ Ratio (hexene/ethylene) | 0.0138 | 0.0148 |
| $H_2$ (ppm) | 288 | 235 |
| $H_2$ ppm/$C_2$ mol % | 4.8 | 3.8 |
| Wt. % Inlet Gas Condensed | 0 | 0 |
| Isopentane (mol %) | 6 | 0 |

A batch of polymer product from each of Examples 2 and 3 were analyzed as described with respect to FIG. 1 and Table II.

Referring now to FIG. 1, Crystallization Analysis Fractionation ("CRYSTAF") curves representing the comonomer distributions of polymers according to Examples 2 and 3 are illustrated. CRYSTAF is an analytical method known to those of ordinary skill in the art. In the examples here, the CRYSTAF data was obtained using a commercial instrument (Model 200) from PolymerChar S. A., Valencia, Spain, and a technique outlined in MACROMOL. MATER. ENG. 279, 46–51 (2000). Generally, however, according to the foregoing technique, the polymer sample is dissolved in ortho-dichlorobenzene at 130° C. to a concentration of 0.10 g polymer/mL solvent. Once the polymer is dissolved, the solution is cooled to 0° C. at the rate of 0.2 ° C./minute. During cooling, the instrument takes a sample of the solution at regular intervals, and with an infrared detector measures the concentration of the polymer in the solution. A curve expressing polymer concentration versus temperature is obtained, which can be used to interpret the comonomer distribution of the polymer sample. FIG. 1 illustrates derivatives of such curves obtained on polymers according to Examples 2 and 3.

In FIG. 1, curve 10 is a derivative curve representing CRYSTAF data for the polymers of Example 2, which were produced under process conditions requiring a hafnium metallocene catalyst and a condensable fluid as delineated in Table I. Curve 12 is a derivative curve representing CRYSTAF data for the polymers of Example 3, which were produced under process conditions requiring a hafnium metallocene catalyst, but not a condensable fluid. As known by those of ordinary skill in the art, those polymers having the least amount of comonomer will crystallize out of solution first, while those with higher amounts of comonomer will crystallize out of solution later. Thus, the peaks at 80° C. appearing in curve 10 and curve 12 represent the population of polymers in Examples 2 and 3 respectively, that has the least amount of comonomer. At 65° C., curve 10 begins to climb again, approaching a peak at 40° C.–45° C. The temperature difference between the first and second peaks if referred to as the "spread". According to this example, the spread between the apex of the first peak and the apex of the second peak is 35–40° C.

In the derivative curves illustrated in FIG. 1, the appearance of a second distinguishable peak at 45° C. indicates a second population of polymers in Example 2, which further indicates that the polymers produced according to Example 2 have a composition distribution that is at least bimodal (i.e., has at least two polymer populations represented by the peak around 80° C. and the peak around 45° C.). The peak in curve 10 at 45° C. illustrates that a significant number of polymers produced according to Example 2 have a similar amount of comonomer.

In contrast, curve 12 does not illustrate an at least bimodal composition, as there are no distinguishable peaks in curve 12 other than that at 80° C. Rather, curve 12 illustrates that the polymers according to Example 3 continue to crystallize out of solution at a relatively uniform rate from 65° C. to 25° C. By comparing curve 10 and curve 12, and in particular, the areas of curve 10 and curve 12 between 30° C. and 65° C., those of ordinary skill in the art would readily recognize that polymers produced according to Example 2 have a more controlled comonomer distribution than those produced according to Example 3. As the solutions cool beyond 30° C., curve 10 and curve 12 further illustrate that the amount of polymers according to Example 2 crystallizing out of solution drops below the amount of polymers according to Example 3 crystallizing out of solution. This indicates that by 30° C., more of the polymers according to Example 2 have crystallized than the polymers according to Example 3, which further indicates that the polymers produced according to Example 2 have a more controlled comonomer distribution than those according to Example 3. Thus, as reported in Table II, the amount (%) of polymer having a temperature of crystallization ("Tc") of less than 30° C. (referred as the "T<30") is lower for the polymers according to Example 2 as compared to the polymers of Example 3.

The Solubility Distribution Breadth Index ("SDBI") and Composition Distribution Breadth Index ("CDBI") for a batch of polymers according to each of Examples 2 and 3 were calculated from the CRYSTAF data represented in FIG. 1. The SDBI and CDBI values, as well as values indicating the amount (%) of polymer having a temperature of crystallization ("Tc") of less than 30° C., the density and the melt viscosity of polymers according to each of Examples 2 and 3, are reported in Table II.

TABLE II

| Polymer Properties | Example 2 | Example 3 |
|---|---|---|
| Density (g/cc) | 0.916 | 0.917 |
| $I_2$ (g/10 min.) | 0.9 | 1.4 |
| $I_{21}/I_2$ | 28.4 | 29.7 |
| Tc < 30° C. (%) | 4.8 | 10.8 |
| SDBI (° C.) | 21.3 | 25.0 |
| CDBI (%) | 27.5 | 24.2 |

Density was measured in accordance with ASTM-D-1238.

The $I_2$ and $I_{21}$ melt indices (which are terms known to those of ordinary skill in the art and) were measured at 190° C. according to ASTM D-1238-F and ASTM D-1238-E, respectively. The melt index value ("$I_2$") reported in Table II is the $I_2$ melt index, while the melt index ratio value ("$I_{21}/I_2$") reported in Table II is the ratio of the $I_{21}$ melt index to the $I_2$ melt index.

The values indicated for "Tc<30° C." represent that amount (%) of polymer having a temperature of crystallization ("Tc") of less than 30° C. (referred to as the "T<30"). The lower the value of the T<30, the more polymers have crystallized out of solution by 30° C., which indicates a more uniform comonomer distribution.

An SDBI value represents a measure of the width of the solubility distribution index of the polymer batch being analyzed. For example, a relatively low SDBI value indicates that the polymers in the batch crystallize (or dissolve, depending on the method) over a narrow temperature range. Methods for calculation of the SDBI of a polymer batch are known to those of ordinary skill in the art, as represented by U.S. Pat. No. 5,322,728. The SDBI value reported in Table II for Example 2 is lower than that reported for Example 3. This illustrates that the polymers in the batch produced according to Example 2 crystallized over a narrower temperature range than those of Example 3, which indicates that the polymers in the batch produced according to Example 2 have a narrower range of comonomer distribution than those of Example 3.

A CDBI value represents the weight percent of the copolymer molecules having a comonomer content within 50% of the median total molar comonomer content. For example, a relatively high CDBI value indicates that most of the polymers in the test batch have a comonomer content that is within 50% of the median comonomer content, which further indicates that the polymers in the batch are relatively uniform. The CDBI of linear polyethylene, which does not contain a comonomer, is defined to be 100%. Methods for calculation of the CDBI of a polymer batch are known to those of ordinary skill in the art, as represented by WIPO Publication No. WO 93/03093. The CDBI value reported in Table II for Example 2 is higher than that reported for Example 3. This illustrates that more of the polymers in the batch produced according to Example 2 are within 50% of the median total molar comonomer content as compared to Example 3. The higher CDBI value indicates that the comonomer distribution of polymers polymerized under conditions employing a hafnium metallocene catalyst component and a condensable fluid, such as those of Example 2, is more controlled than the comonomer distribution of the same polymers polymerized under conditions that do not employ a hafnium metallocene catalyst component and a condensable fluid.

As reported in Table II, the $I_2$ and $I_{21}/I_2$ values obtained for the polymers according to Example 2 were lower than those obtained for the polymers according to Example 3. The lowering of the melt index in the polymers according to Example 2 is unexpected because the hydrogen concentration is greater in Example 2 than in Example 3. Those of ordinary skill in the art would have expected the melt index of the polymers according to Example 2 to be higher than the melt index of the polymers according to Example 3 because of the greater hydrogen concentration in Example 3. Accordingly, the present embodiments unexpectedly provide a method for controlling the melt viscosity of a polymer. To attain a targeted melt viscosity for the polymers produced according to Example 2, the hydrogen concentration in the reactor can be increased, or decreased, accordingly. Methods according to the present embodiments for controlling the melt viscosity are further illustrated in Examples 5 and 6.

Example 4

Catalyst Preparation

Bis (n-propylcyclopentadienyl) hafnium difluoride metallocene catalyst was synthesized according to a similar procedures as Example 1, except that the Al:Hf ratio was 120:1.

Examples 5–6

Polymer Production

Referring to Table III, Example 5 represents a polyethylene polymer extruded from approximately 2.5 bed turnovers of granules from a lined-out gas phase reactors operating under the conditions reported in Table III. Example 6 represents a combination of polyethylene polymers extruded from approximately 3.5 bed turnovers of granules from a lined-out gas phase reactors operating under the conditions reported in Table III. The polymerization catalyst used was the catalyst described in Example 4. Example 5 illustrates polymers produced according to the methods of the present embodiments, while Example 6 provides a comparative example.

The Bed Temp. reported in Table III is the bed temperature of polymerization. Hexene was the comonomer. The $C_6/C_2$ Ratio is the gas phase hexene/ethylene concentration ratio. The $H_2$ concentration reported in the table is the amount of hydrogen (ppm) in the reactor. The $H_2/C_2$ ratio is the ratio of hydrogen concentration (ppm) to ethylene concentration (mol %).

The ethylene/1-hexene copolymers of Examples 5 and 6 were produced in accordance with the following general procedure. Polymerization was conducted in a 14 inch diameter gas-phase fluidized bed reactor operating at approximately 350 psig total pressure. The reactor bed weight was approximately 100 pounds. Fluidizing gas was passed through the bed at a velocity of approximately 2.0 feet per second. The fluidizing gas exiting the bed entered a resin disengaging zone located at the upper portion of the reactor. The fluidizing gas then entered a recycle loop and passed through a cycle gas compressor and water-cooled heat exchanger. The shell side water temperature was adjusted to maintain the reaction temperature to the specified value. Ethylene, hydrogen, 1-hexene and nitrogen were fed to the cycle gas loop just upstream of the compressor at quantities sufficient to maintain the desired gas concentrations. Gas concentrations were measured by an on-line vapor fraction analyzer. The catalyst was fed to the reactor bed through a stainless steel injection tube at a rate sufficient to maintain the desired polymer production rate. Nitrogen gas was used to disperse the catalyst into the reactor. Product was withdrawn from the reactor in batch mode into a purging vessel before it was transferred into a product drum. Residual catalyst and cocatalyst in the resin was deactivated in the product drum with a wet nitrogen purge.

According to Example 5, isopentane, as a condensable fluid, was also a separate feed into the reactors. Isopentane was fed to the reactors at a rate sufficient to maintain the mole percentage in the reactors as reported in Table III.

TABLE III

| Condition | Ex. 5 | Ex. 6 |
| --- | --- | --- |
| Bed Temp. (° C.) | 77 | 77 |
| Partial Pressure of Ethylene (psia) | 220 | 252 |
| $C_6/C_2$ Ratio | 0.0150 | 0.0169 |
| $H_2$ (ppm) | 314 | 259 |
| $H_2/C_2$ Ratio | 5.2 | 3.8 |
| Wt % Inlet Gas Condensed | 0 | 0 |
| Isopentane (mol %) | 6 | 0 |

A batch of polymer product from each of Examples 5 and 6 were analyzed as described with respect to FIG. 2 and Table IV.

Referring now to FIG. 2, derivative curves representing CRYSTAF data for polymers according to Examples 5 and 6 are illustrated. The CRYSTAF analysis of Examples 5 and 6 was conducted as described above with respect to Examples 2 and 3.

In FIG. 2, curve 20 represents CRYSTAF data for the polymers of Example 5, which were produced under process conditions requiring a hafnium metallocene catalyst and a condensable fluid as delineated in Table III. Curve 22 represents CRYSTAF data for the polymers of Example 6, which were produced under process conditions requiring a hafnium metallocene catalyst, but not a condensable fluid. As discussed above with respect to FIG. 1, those polymers having the least amount of comonomer will crystallize out of solution first, while those with higher amounts of comonomer will crystallize out of solution later. Thus, the peaks at 80° C. appearing in curve 20 and curve 22 represent the population of polymers in Examples 5 and 6, respectively, that have the least amount of comonomer.

At 65° C., curve 20 begins to climb again, approaching a peak at 40° C.–45° C. The temperature difference between the first and second peaks in curve 20 is referred to as the "spread". According to this example, the spread between the apex of the first peak and the apex of the second peak in curve 20 is 35–40° C.

The appearance of the second distinguishable peak at 45° C. indicates a second population of polymers in Example 5, which further indicates that the polymers produced according to Example 5 have a composition distribution that is at least bimodal (i.e., has at least two polymer populations represented by the peak around 85° C. and the peak around 45° C.). The peak in curve 20 at 45° C. illustrates that a significant number of polymers produced according to Example 5 have a similar amount of comonomer.

In contrast, curve 22 does not illustrate an at least bimodal composition, as there are no peaks in curve 22 other than that at 80° C. Rather, curve 22 illustrates that the polymers according to Example 6 continue to crystallize out of solution at a relatively uniform rate from 65° C. to 25° C. By comparing curve 20 and curve 22, and in particular, the areas of curve 20 and curve 22 between 30° C. and 65° C., those of ordinary skill in the art would readily recognize that polymers produced according to Example 5 have a more controlled comonomer distribution than those of Example 6. As the solutions cool beyond 30° C., curve 20 and curve 22 further illustrate that the amount of polymers according to Example 5 crystallizing out of solution drops below the amount of polymers according to Example 6 crystallizing out of solution. This indicates that by 30° C., more of the polymers according to Example 5 have crystallized than the polymers according to Example 6, which further indicates that the polymers produced according to Example 5 have a more controlled comonomer distribution than those according to Example 6. Thus, as reported in Table IV, the amount (%) of polymer having a temperature of crystallization ("Tc") of less than 30° C. (referred as the "T<30") is lower for the polymers according to Example 5 as compared to the polymers of Example 6.

The SDBI and CDBI for a batch of polymers according to each of Examples 5 and 6 were calculated from the CRYSTAF data represented in FIG. 2. The SDBI and CDBI values, as well as values indicating the amount (%) of polymer having a temperature of crystallization ("Tc") of less than 30° C., the density and the melt viscosity of polymers according to each of Examples 5 and 6 are reported in Table IV.

TABLE IV

| Polymer Properties | Ex. 5 | Ex. 6 |
| --- | --- | --- |
| Density (g/cc) | 0.9178 | 0.9184 |
| $I_2$ (g/10 min.) | 0.84 | 0.79 |
| $I_{21}/I_2$ | 33.0 | 34.6 |
| Tc < 30° C. | 7.1 | 13.7 |
| SDBI (° C.) | 22.6 | 26.3 |
| CDBI (%) | 26.9 | 21.2 |

Density was measured in accordance with ASTM-D-1238.

The $I_2$ and $I_{21}$ melt indices (which are terms known to those of ordinary skill in the art and) reported in Table IV were measured at 190° C. according to ASTM D-1238-F and ASTM D-1238-E, respectively. The melt index value ("$I_2$") reported in Table I is the $I_2$ melt index, while the melt index ratio value ("$I_{21}/I_2$") reported in Table IV is the ratio of the $I_{21}$ melt index to the $I_2$ melt index.

The values indicated for "Tc<30° C." represent that amount (%) of polymer having a temperature of crystallization ("Tc") of less than 30° C. The lower the value of the T<30, the more polymers have crystallized out of solution by 30° C., which indicates a more uniform comonomer distribution.

As discussed above with respect to Table II, a relatively low SDBI value indicates that the polymers in the batch crystallize (or dissolve, depending on the method) over a narrow temperature range. The SDBI value reported in Table IV for Example 5 is lower than that reported for Example 6. This illustrates that the polymers in the batch produced according to Example 5 crystallized over a narrower temperature range than those of Example 6, which indicates that that the polymers in the batch produced according to Example 5 have a narrower range of comonomer distribution than those of Example 6.

Also as discussed above with respect to Table II, a relatively high CDBI value indicates that most of the polymers in the test batch have a comonomer content that is within 50% of the median comonomer content, which further indicates that the polymers in the batch are relatively uniform. The CDBI value reported in Table IV for Example 5 is higher than that reported for Example 6. This illustrates that more of the polymers in the batch produced according to Example 5 are within 50% of the median total molar comonomer content as compared to Example 6, which further indicates that the polymers produced according to Example 5 have a more controlled comonomer distribution than those of Example 6.

As reported in Table IV, the $I_2$ and $I_{21}/I_2$ values obtained for the polymers according to Example 5 did not differ significantly from those obtained for the polymers according to Example 6, despite the fact that the hydrogen concentration employed with Example 5 was greater than in Example 6 (314 ppm to 259 ppm, respectively), and the ratio of hydrogen concentration to ethylene concentration according to Example 5 was also greater than that in Example 6. This illustrates a method for controlling a melt viscosity, and of achieving a targeted melt viscosity for a polymer, by adjusting the hydrogen concentration used in a polymerization process that also uses a hafnium metallocene catalyst and a condensable fluid.

Examples 7–8

Film Production and Film Properties

Polymers according to Examples 5 and 6 were extruded into films, as Examples 7 and 8, respectively, using a 2.5" Battenfield Gloucester blown film line (30:1 L:D DSB-II screw) equipped with a 6" oscillating die and a Future Design air ring. The die gap was 75 mils and the blow-up-ratio (BUR) was 2.5. Melt temperature was 414° F. Output rate was 188 lb/h (10 lb/h/in die circumference.

The MD Tear values of the films illustrated by Examples 7 and 8 were determined according to ASTM-D-11922-00. The Dart Impact values of the films illustrated by Examples 7 and 8 were determined according to ASTM-D-1709-01. The results of the MD Tear and Dart Impact tests are reported in Table V in g/mil, which is understood by those of ordinary skill in the art to indicate grams of force applied per mil of film, where a mil is understood by those of ordinary skill in the art to be approximately 0.001 inches. The MD tear values reported in Table V are the average of MD tear values obtained from three separate tests performed on each of Examples 7 and 8, respectively. The Dart Impact values reported in Table V are the average of two separate tests performed on each of Examples 7 and 8, respectively.

TABLE V

| Film Properties | Example 7 | Example 8 |
|---|---|---|
| MD Tear (g/mil) | 460 | 540 |
| Dart Impact (g/mil) | 990 | 795 |

As reported in Table V, film produced from polymers prepared according to methods of the present embodiments (i.e., Example 7) exhibited a lower MD tear value and a higher Dart Impact value than did the film produced from polymers that were not prepared according to methods of the present embodiments (i.e., Example 8). Accordingly, the present embodiments provide a method for controlling the balance of film properties, such as MD tear and dart impact, by polymerizing the polyolefins from which such films are made under conditions employing a hafnium metallocene catalyst component and a condensable fluid.

Examples 9–13

Polymer Production

Examples 9–13 are polyethylene polymers that were polymerized in a single gas phase reactor using a bis(propylcyclopentadienyl)hafnium dichloride catalyst and an Al:Hf ratio of 80:1, prepared as described in Example 1. The polymerizations were conducted according to the conditions listed in Table VI.

Examples 11–13 illustrate polymers produced according to the methods of the present embodiments, where a condensable fluid as described herein, namely, isopentane, was present in the amounts reported in Table VI. Examples 9 and 10 are comparative examples, where the polymers were produced in the absence of a condensable fluid as described herein.

The Bed Temp. reported in Table VI is the bed temperature of polymerization. Hexene was the comonomer. The $C_6/C_2$ Ratio is the gas phase hexene/ethylene concentration ratio. The $H_2$ concentration reported in the table is the amount of hydrogen (ppm) in the reactor.

The ethylene/1-hexene copolymers of Examples 9–13 were produced in accordance with the following general procedure. Polymerization was conducted in a 14 inch diameter gas-phase fluidized bed reactor operating at approximately 350 psig total pressure. The reactor bed weight was approximately 100 pounds. Fluidizing gas was passed through the bed at a velocity of approximately 2.0 feet per second. The fluidizing gas exiting the bed entered a resin disengaging zone located at the upper portion of the reactor. The fluidizing gas then entered a recycle loop and passed through a cycle gas compressor and water-cooled heat exchanger. The shell side water temperature was adjusted to maintain the reaction temperature to the specified value. Ethylene, hydrogen, 1-hexene and nitrogen were fed to the cycle gas loop just upstream of the compressor at quantities sufficient to maintain the desired gas concentrations. Gas concentrations were measured by an on-line vapor fraction analyzer. The catalyst was fed to the reactor bed through a stainless steel injection tube at a rate sufficient to maintain the desired polymer production rate. Nitrogen gas was used to disperse the catalyst into the reactor. Product was withdrawn from the reactor in batch mode into a purging vessel before it was transferred into a product drum. Residual catalyst and cocatalyst in the resin was deactivated in the product drum with a wet nitrogen purge.

According to Examples 11–13, isopentane, as a condensable fluid, was also a separate feed into the reactor. Isopentane was fed to the reactor at a rate sufficient to maintain the mole percentage in the reactor as reported in Table VI.

TABLE VI

| Condition | Ex. 9 | Ex. 10 | Ex. 11 | Ex. 12 | Ex. 13 |
|---|---|---|---|---|---|
| Bed Temp. (° C.) | 77 | 77 | 77 | 77 | 77 |
| Partial Pressure of Ethylene (psia) | 240 | 240 | 240 | 240 | 240 |
| $C_6/C_2$ Ratio (hexene/ethylene) | 0.017 | 0.0164 | 0.0163 | 0.0163 | 0.0164 |
| $H_2$ (ppm) | 232 | 255 | 240 | 231 | 206 |
| Isopentane (mol %) | 0 | 0 | 5.4 | 4.9 | 9.6 |

CRYSTAF data was determined on a batch of polymer product from each of Examples 9–13. The CRYSTAF data for Examples 9–13 is illustrated in FIG. 3.

The instrument used to determine the CRYSTAF data illustrated in FIG. 3 differed from that used to determine the CRYSTAF data illustrated in FIGS. 1 and 2. In particular, the CRYSTAF data for Examples 9–13 was obtained using a CRYSTAF QC model instrument, which is commercially available from PolymerChar S. A., Valencia, Spain. The method for using such instrument, however was substantially similar to that described for FIGS. 1 and 2, except that the solvent used to dissolve the polymer samples of Examples 9–13 was 1,2,4-trichlorobenzene, the cooling rate was 0.97° C./minute, and the sample was cooled to 30° C. Thus, in Examples 9–13, each polymer sample is dissolved in 1,2,4-trichlorobenzene at 130° C. to a concentration of 0.10 g polymer/mL solvent. Once the polymer sample is dissolved, the solution is cooled to 30° C. at the rate of 0.97 ° C./minute.

During cooling, the instrument takes a sample of the solution at regular intervals, and with an infrared detector measures the concentration of the polymer in the solution. A curve expressing polymer concentration versus temperature is obtained. The curves obtained on polymers according to Examples 9–13 are illustrated in FIG. 3, and illustrate the efficacy of polymerization conditions employing a bis(propylcyclopentadienyl)hafnium dichloride catalyst and a condensable fluid on comonomer distribution.

The curves illustrated in FIG. 3 differ in appearance from the curves of FIGS. 1 and 2. In particular, the curves illustrated in FIG. 3 for polymers according to Examples 11–13 do not have the second distinguishable peak between 30 and 50° C. that appears in FIGS. 1 and 2. The different instrument, cooling rate, solvent, and cool to temperature used to generate the data illustrated in FIG. 3 as compared to those used to generate the data illustrated in FIGS. 1 and 2 likely had an effect on the different appearances of the curves. Regardless, however, the area below 30° C. of the curves illustrated in FIG. 3 illustrates the effect on comonomer distribution according to the present invention.

In FIG. 3, curves 30 and 32, respectively, represent CRYSTAF data for the polymers of Examples 9 and 10, respectively. Curve 34 represents CRYSTAF data for the polymers of Example 11. Curve 36 represents CRYSTAF data for the polymers of Example 12, and curve 38 represents CRYSTAF data for the polymers of Example 13.

As the polymer solutions cool beyond 30° C., curves 30 and 32 clearly indicate that by 30° C., more of the polymers according to Examples 9 and 10 remain in solution as compared to the amount of polymers remaining in solution for Example 11, indicated by curve 34, Example 12, indicated by curve 36, and Example 13, indicated by curve 38. The fact that a lesser amount of polymers have remained in solution in Examples 11–13, (i.e., the polymers have crystallized out), indicates that the polymers produced according to Examples 11–13 have a more controlled comonomer distribution than those according to Examples 9 and 10. Thus, as reported in Table VIII, the amount (%) of polymer having a temperature of crystallization ("Tc") of less than 30° C. (referred as the "T<30") is lower for the polymers according to Examples 11–13 as compared to the polymers of Examples 9 and 10.

The amount (%) of polymer having a temperature of crystallization ("Tc") of less than 30° C., the density and the melt viscosity of the polymers according to each of Examples 9–13 are reported in Table VII.

TABLE VII

| Polymer Properties | Ex. 9 | Ex. 10 | Ex. 11 | Ex. 12 | Ex. 13 |
|---|---|---|---|---|---|
| $I_2$ (g/10 min.) | 0.54 | 0.77 | 0.51 | 0.48 | 0.34 |
| $I_{21}/I_2$ | 29.7 | 29.0 | 30.9 | 29.9 | 34.3 |
| Density (g/cc) | 0.9144 | 0.9157 | 0.9167 | 0.9176 | 0.9168 |
| Tc < 30° C. | 17.6 | 16.5 | 10.6 | 9.4 | 7.4 |

Density was measured in accordance with ASTM-D-1238.

The $I_2$ and $I_{21}$ melt indices (which are terms known to those of ordinary skill in the art and) were measured at 190° C. according to ASTM D-1238-F and ASTM D-1238-E, respectively. The melt index value ("$I_2$") reported in Table II is the $I_2$ melt index, while the melt index ratio value ("$I_{21}/I_2$") reported in Table II is the ratio of the $I_{21}$ melt index to the $I_2$ melt index.

The values indicated for "Tc<30° C." represent that amount (%) of polymer having a temperature of crystallization ("Tc") of less than 30° C. The lower the value of the T<30, the more polymers have crystallized out of solution by 30° C., which indicates a more uniform comonomer distribution. The T<30s indicated for Examples 11–13 demonstrate the polymers produced under conditions employing a hafnium metallocene catalyst component and a condensable fluid have a more uniform comonomer distribution than those produced under conditions without. In addition, the amount (%) of polymer having a temperature of crystallization ("Tc") of less than 30° C. reported for Examples 11–13 indicate that the effect on comonomer distribution could be controlled by adjusting the amount of condensable fluid used in the reaction conditions. For example, by increasing the concentration of the condensable fluid from the 4.9 mol % and 5.4 mol %, which are embodiments illustrated by Examples 11 and 12, to 9.6 mol %, which is an embodiment illustrated by Example 13, the amount of polymer having a Tc<30° C. decreases at least 2%. This indicates that the polymers of Example 13 have a more uniform comonomer distribution, and further indicates that the comonomer distribution can be controlled by adjusting the concentration of condensable fluid in the polymerization reactor.

The invention claimed is:

1. A method of producing a polyolefin comprising:
   contacting in a fluidized bed gas phase reactor an olefin monomer and at least one comonomer with a catalyst system in the presence of a first amount of at least one condensable fluid to produce a first polyolefin;
   followed by contacting a second amount of at least one condensable fluid to produce a second polyolefin;
   characterized in that when the amount of condensable fluid contacted is changed incrementally from 0 mol % to 30 mol %, the CDBT of the second polyolefin is greater than that of the first polyolefin.

2. The method of claim 1, wherein the catalyst system is characterized in that the polyolefin produced from the catalyst possesses a composition distribution breadth index (CDBI) of less than 50 percent.

3. The method of claim 1, wherein the catalyst system comprises a Group 4, 5 or 6 metallocene.

4. The method of claim 1, wherein the catalyst system comprises a hafnocene.

5. The method of claim 1, wherein the CDBI increases by from 2 to 10% for every 2 to 5 mol % increase in the amount of condensable fluid.

6. The method of claim 1, wherein the olefin monomer is ethylene and the at least one comonomer is hexene and wherein the solubility distribution index (SDBI) of the second polyolefin is less than that of the first polyolefin.

7. The method of claim 1, wherein the olefin monomer is ethylene and the at least one comonomer is hexene and wherein the T<30 value of the second polyolefin is less than that of the first polyolefin.

8. The method of claim 1, wherein the at least one condensable fluid comprises a hydrocarbon selected from the group consisting of ethane, propane, n-butane, isobutane, n-pentane, isopentane, neopentane, n-hexane, isohexane, heptane, n-octane and mixtures thereof.

9. The method of claim 1, wherein the catalyst system comprises a hafnium metallocene catalyst component selected from the group consisting of bis(n-propylcyclopentadienyl) hafnium $X_n$, bis(n-butylcyclopentadienyl) hafnium $X_n$, or bis(n-pentylcyclopentadienyl) hafnium $X_n$, where X is one of chloride or fluoride and n is 2.

10. The method of claim 1, wherein the olefin monomer is ethylene and the comonomer is selected from C3 to C10 α-olefins.

11. The method of claim 1, wherein the first and second polyolefins has a bimodal composition distribution that is recognizable in a crystallization analysis fractionation ("CRYSTAF") curve by at least a first peak char is separated by a spread from a second peak.

12. The method of claim 11, wherein the spread is in the range of from 25 degrees to 40 degrees.

13. The method of claim 4, wherein the contacting occurs in the presence of hydrogen and the method further comprises adjusting at least one of the concentration of hydrogen and the concentration of the condensable fluid to produce polyolefin having a targeted melt viscosity.

* * * * *